Jan. 12, 1960 W. W. MAYS 2,920,515
INFLATABLE PRODUCT REPAIR TOOL
Filed July 31, 1957 2 Sheets-Sheet 1
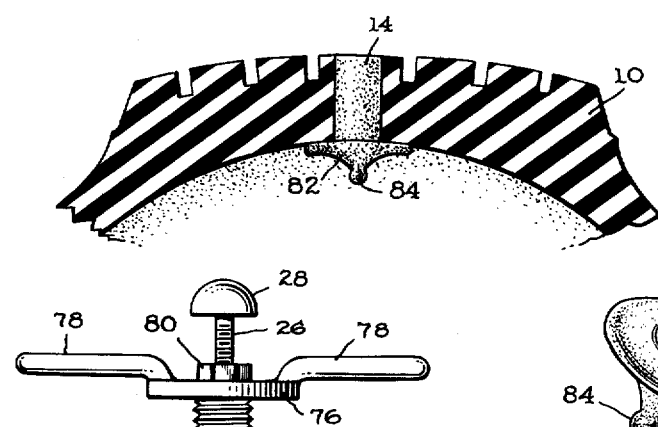
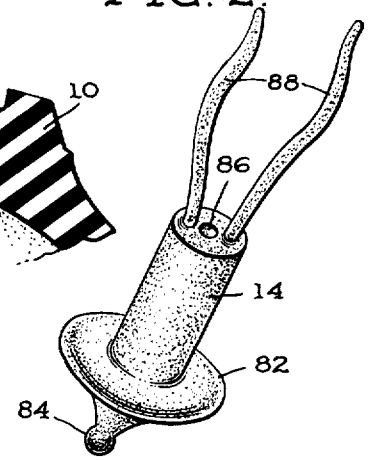
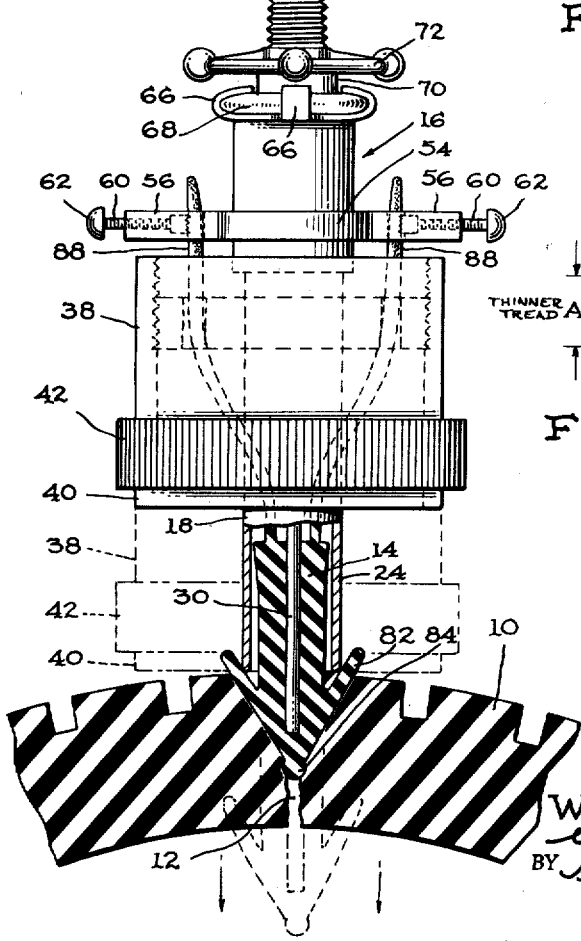
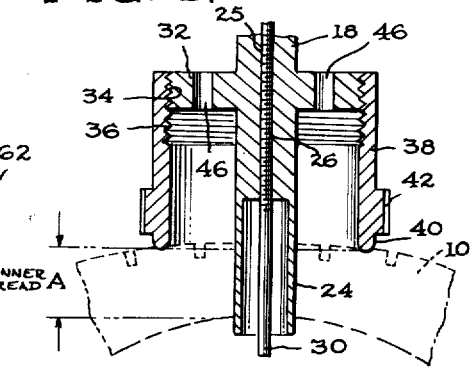
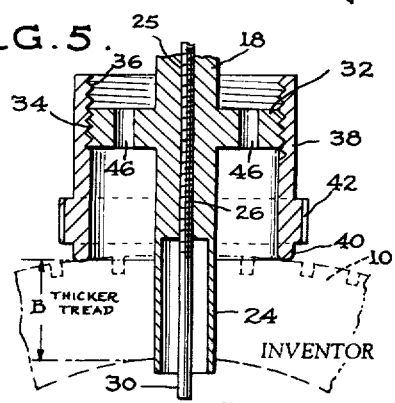
INVENTOR
WILBURT W. MAYS
BY Gustave Miller
ATTORNEY Jan. 12, 1960 W. W. MAYS 2,920,515
INFLATABLE PRODUCT REPAIR TOOL
Filed July 31, 1957 2 Sheets-Sheet 2
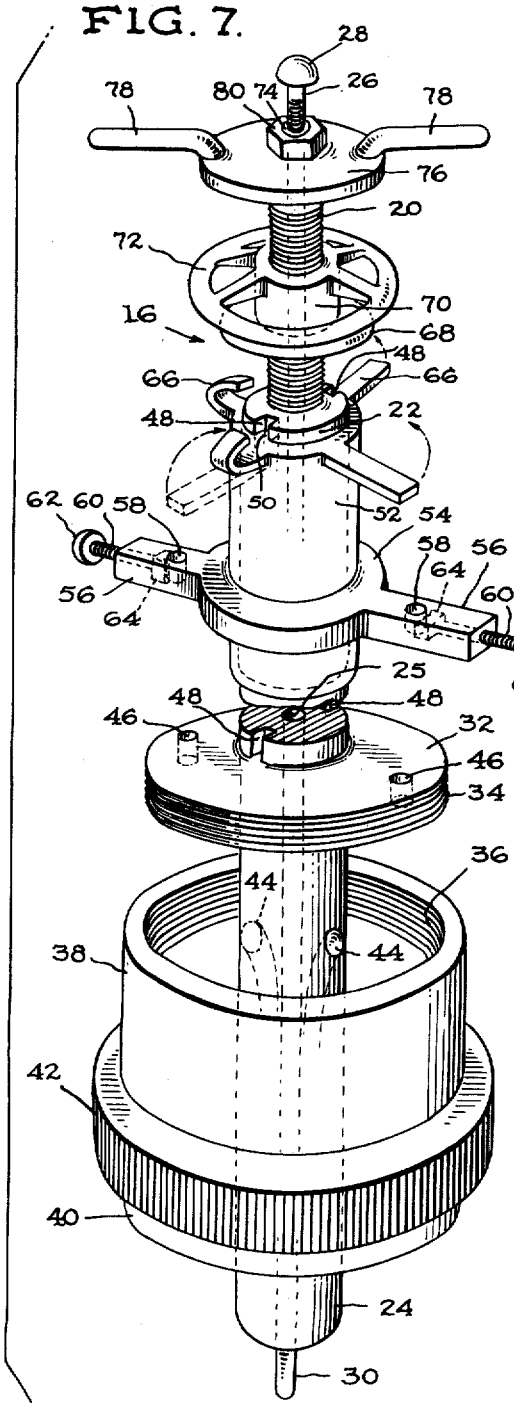
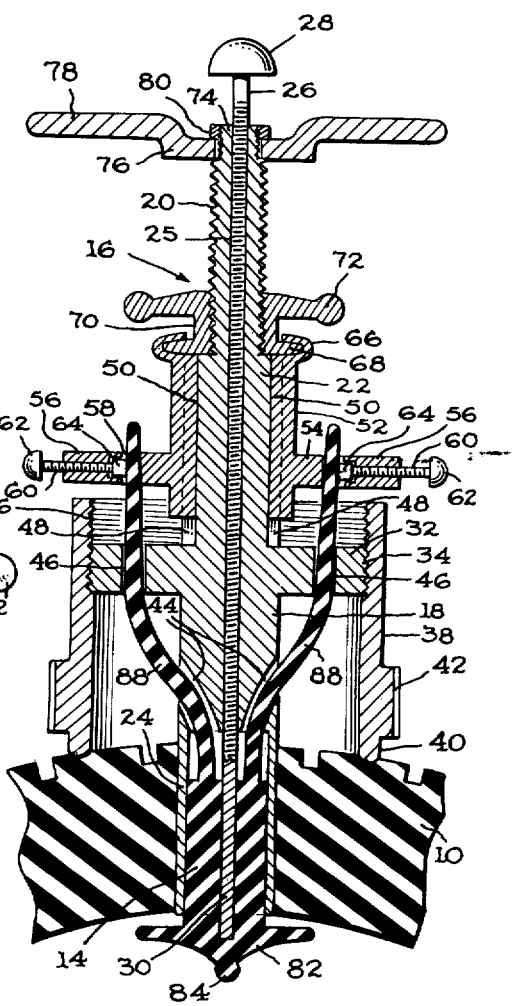
INVENTOR
WILBURT W. MAYS
ATTORNEY

United States Patent Office 2,920,515
Patented Jan. 12, 1960

2,920,515
INFLATABLE PRODUCT REPAIR TOOL
Wilburt W. Mays, Philadelphia, Pa.
Application July 31, 1957, Serial No. 675,443
7 Claims. (Cl. 81—15.7)

This invention relates to a device for repairing punctures in inflatable products, and it particularly relates to a tool for inserting repair plugs in the inflatable products.

This invention may be used to repair many different types of articles such as rubber boats, life vests, beach balls, life rafts, inflatable mattresses, etc. However, it is particularly useful in repairing tubeless type rubber tires. Prior tools used to repair tubeless tires did not make any provision for the thickness of the tire wall so that when the repair plug was forced through the puncture, it would sometimes be forced clear through the puncture and fall into the air space. This not only caused the loss of the plug but made it necessary to insert a new plug with the tool thereby stretching the puncture hole. This enlarged the hole and caused the repair plug to be held less tightly than if the first plug had been properly inserted. Furthermore, the plug which had fallen into the air space caused an irritating and unpleasant knocking sound as it rolled around loosely within the tire during rotation thereof.

It is one object of the present invention to overcome the above and other disadvantages of the prior type repair means by providing a tool which is capable of properly inserting a repair plug in a tubeless tire or the like without danger of its falling through.

Another object of the present invention is to provide a repair tool, of the above type, which is easy to handle and simple to operate.

Another object of the present invention is to provide a repair tool of the above type, which is simple in construction, easy to maintain in good condition and not prone to disrepair.

Other objects of the present invention are to provide an improved repair device, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which:

Fig. 1 is a fragmentary, sectional view of a repaired tire, showing the plug in place, the plug being shown in elevation.

Fig. 2 is a perspective view of the plug prior to insertion.

Fig. 3 is a side view, partly in section and partly in elevation, showing the tool, embodying the present invention, in operative position whereby a plug is being inserted in the tire puncture.

Fig. 4 is a fragmentary sectional view of a portion of the tool of Fig. 3, showing it adjusted for a tire of relatively thin tread.

Fig. 5 is a view similar to that of Fig. 4, but showing it adjusted for a tire of relatively thick tread.

Fig. 6 is a sectional view showing the tool of Figs. 3 to 5 in its fully inserted position just prior to being removed.

Fig. 7 is a perspective, partially exploded view of the tool shown in Figs. 3 to 6.

Referring now in greater detail to the drawings wherein similar reference characters refer to similar parts, where is shown a tire 10, of the tubeless type, having a puncture 12 to which is to be applied a repair plug 14 of rubber or the like.

The plug 14 is applied by means of the tool, generally designated 16, which comprises a shaft 18 having a reduced, externally threaded portion 20 defined by a shoulder 22, at one end, and a hollow, cylindrical portion 24 at its other end. A threaded bore 25 extends centrally through the longitudinal extent of the shaft 18 and in this bore is threadedly positioned a threaded rod 26. This rod 26 has a knob 28 at one end, adjacent the upper end of the reduced portion 20, and a squared, unthreaded portion 30 at the other end, extending through the hollow portion 24 of the shaft 18.

Intermediate the shoulder 22 and the hollow portion 24, the shaft 18 is provided with an annular flange 32 of disc-shaped form, and this flange is provided with screw-threads 34 on its external periphery. These threads 34 are adapted to threadedly engage with the internal threads 36 of a cylindrical sleeve or collar 38. This collar 38 has an annular stop rim 40 at its lower end and a knurled ring portion 42 on its side wall periphery.

Immediately above the hollow portion 24, the shaft 18 is provided with a pair of oppositely-extending, outwardly curved bores 44 extending from a joint position at the upper end of the hollow portion 24 to the outer periphery of the shaft below the flange 32. The flange itself is provided with a pair of oppositely-positioned, vertical bores 46. Above the flange, the shaft 18 is provided with oppositely-disposed, vertical key-ways 48 to corresponding keys 50 on the internal periphery of a cylindrical sleeve 52. The sleeve 52 is provided with an integral ring portion 54 from which extends a pair of oppositely-disposed arms 56. In each of these arms 56 is provided a vertical bore 58 which is intersected by a radially-extending horizontal threaded bore in which is threadedly positioned a threaded rod 60. Each rod 60 extends outwardly of the end of the arm 56 and is provided with a knob 62. At its inner end, each rod 60 is provided with a vise block 64.

The upper end of the sleeve 52 is provided with fingers 66 which are folded over a flange 68 on the bottom of an internally-threaded nut 70. The upper end of nut 70 is provided with a spoke-wheel 72 for turning the nut.

At the upper end of the reduced portion 20 of the shaft 18 is provided a further reduced, squared end (see Fig. 6) upon which is fixed a disc handle 76 having hand-holds 78. A nut 80 threaded onto a still further reduced and threaded end 74 holds the handle on the shaft.

In operation, the rubber plug 14, provided with a conical head 82 ending in a beaded tip 84, a central bore 86 and a pair of tails 88, is inserted in the hollow portion 24 of the tool after first being coated with a proper type of cement or bonding agent. The plug is inserted into the tool by first threading the tails 88 through the hollow portion 24, up through the bores 44, through the bores 46 in the flanges 32 and through the bores 58 in the arms 56. The bolts 60 are then moved in to press the vises 64 against the tails to lock them in the bores 58. The wheel 72 is then turned to threadedly move the nut 70 upwards on the threaded shaft portion 20. This moves up the sleeve 52 which acts to pull up the tails 88 of the plug. This draws the plug up into the hollow shaft portion 24 until the plug is in approximately the position shown in Fig. 6. In this position, the squared end 30 of the rod 26 is within the bore 86 of the plug. The stop sleeve or collar 38 is then adjusted by means of its knurled ring portion 42 into the proper position relative to the thickness of the tire tread.

The rod 26 is then screwed down to apply an interior force on the head of the plug which causes the head of the plug to stretch into the taut, steeply inclined angular shape indicated in Fig. 3. In this position, the tool and plug are applied to the puncture 12 of the tire and, while the operator grasps the handles 78, the plug is forced into the puncture until the portion 40 of the stop collar 38 abuts against the tire. At this point, the head of the plug has cleared the tire casing and is within the air space just under the internal casing surface. The rod 26 is then screwed back to release the internal tension on the plug head and to permit the head to snap back into its normal position shown in Fig. 6. In this position, the head 82 overlaps the inner casing surface and firmly anchors the plug in place. The tails 88 are then released from the grip of the vises 64 and the tool is withdrawn leaving the plug in the puncture. The upper portion of the plug extending beyond the tire tread, as well as the tails, are then cut off leaving a smooth surface such as indicated in Fig. 1.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A repair device for inflatable articles comprising a shaft having a hollow portion at one end and a threaded portion at the opopsite end, a nut having internal threads in engagement with the threaded portion of said shaft, a sleeve surrounding said shaft and connected to said nut for movement therewith axially of said shaft, and retaining means on said sleeve for retaining extensions of a flexible plug when said plug is positioned in said hollow portion of the shaft, said retaining means comprising a plurality of radially extending arms on said sleeve, a bore in each arm, a releasable vise block in each of said bores, and openings in said shaft leading from said hollow portion of the shaft toward the planes of said bores.

2. The device of claim 1 wherein a collar is provided on said shaft, said collar being adjustable axially of said shaft and having a stop means at one end thereof.

3. The device of claim 1 wherein said shaft is provided with an axial bore extending from said hollow portion through the threaded portion, and a rod in said axial bore, said rod being movable longitudinally of said shaft.

4. A repair device for inflatable articles comprising a generally cylindrical shaft, a longitudinal bore extending completely through said shaft, a rod in said bore in threaded engagement with said bore, a handle on said rod externally of one end of said shaft, an open-ended hollow portion at the opposite end of said shaft, an annular flange on said shaft intermediate said hollow portion and said handle on said rod, screw-threads on the outer periphery of said flange, an internally-threaded annular collar threadedly connected to said flange, outwardly-inclined passages radiating from the closed end of said hollow portion to the outer periphery of said shaft, axially-extending bores in said flange located radially outward of said passages, an axially-adjustable sleeve on said shaft intermediate said flange and the handle on said rod, radially-extending arms on said sleeve, bores in said arms corresponding to the bores in said flanges, and releasable locking means in the bores in said arms.

5. The device of claim 4 wherein said sleeve is connected to a nut in threaded engagement with a portion of said shaft for movement with said nut in the axial direction of said shaft.

6. The device of claim 4 wherein said releasable locking means are vise blocks, each block being connected to a threaded stem threadedly engaged in a bore transverse to and intersecting the corresponding bore in the arm, and a knob on each of said stems externally of the corresponding arm.

7. The device of claim 4 wherein said shaft is provided with a handle on the end opposite said hollow portion.

References Cited in the file of this patent

UNITED STATES PATENTS

| | | |
|---|---|---|
| 569,896 | Cauwenberg | Oct. 20, 1896 |
| 864,226 | Blodgett | Aug. 27, 1907 |
| 1,332,412 | Ranney | Mar. 2, 1920 |
| 1,439,567 | Maupin | Dec. 19, 1922 |
| 1,479,325 | Schubel | Jan. 1, 1924 |
| 2,828,657 | Fromberg | Apr. 1, 1958 |